June 15, 1954

G. A. SCHURMAN 2,681,442

SEISMIC WAVE VELOCITY LOGGING APPARATUS

Filed Dec. 19, 1951

INVENTOR
GLENN A. SCHURMAN

BY *Walter G. Miller*
*O. L. Long*

ATTORNEYS

INVENTOR
GLENN A. SCHURMAN
BY Walter G. Mills
O. S. Long
ATTORNEYS

Patented June 15, 1954

2,681,442

UNITED STATES PATENT OFFICE 2,681,442

SEISMIC WAVE VELOCITY LOGGING APPARATUS

Glenn A. Schurman, Whittier, Calif., assignor to California Research Corporation, San Francisco, Calif., a corporation of Delaware Application December 19, 1951, Serial No. 262,459

7 Claims. (Cl. 340—17)

The present invention relates to velocity measurements of seismic waves and more particularly relates to apparatus for measuring the velocity of seismic waves through earth formations. Specifically, this includes a housing for a seismic wave responsive geophone or transducer which will protect the latter from the effects of vibrations transmitted through the supporting cable and also from well fluid and detritus in a well bore.

This is a continuation-in-part of my copending application, Serial No. 212,218, filed February 23, 1951, now abandoned.

In the interpretation of seismic wave records utilized in determining the subsurface geological structure, the accuracy with which such records may be evaluated is directly dependent upon the data obtained from velocity measurements of seismic waves through the subsurface. Normally, this velocity data is obtained by the method known as well velocity shooting. In general, this method comprises the steps of suspending seismic wave responsive apparatus, such as a geophone, at predetermined levels in a well bore of any desired depth, such as an oil well bore, and then generating seismic waves by a charge of dynamite near the earth's surface, preferably in a shot hole laterally offset at a predetermined distance from the well bore in which the geophone is disposed. From the measurement of time elapsing between the generation of the seismic wave and its reception by the geophone in the well, as well as the distance between the source of seismic waves and the geophone, it is possible to determine the velocity of seismic waves in the intervening earth strata.

As particularly discussed in "Geophysics," vol. 14, No. 3, July, 1949, pages 346 to 356, a number of sources of possible error have been recognized in the measurement of seismic wave velocities by the above-described method. Among these possible sources of error in determining velocity are: the measurement of the depth in the well of the position of the geophone, depth measurement to the dynamite charge, and the shattering effect on the formation surrounding the shot hole in which a dynamite charge is detonated. However, the error of greatest magnitude which has been recognized in the obtaining of such velocity data is that known as cable-borne impulses at depths of less than about 3,000 to 4,000 feet. This difficulty is believed to arise in the following manner.

When a geophone is suspended by an electrical logging cable means having sufficient physical strength to raise and lower the geophone, as well as provide electrical conductors for detecting electrical quantities generated by the geophone, such a cable may act as a transmission line for seismic waves. At relatively shallow depths, for example, less than about 3,000 to 4,000 feet, and with the shot hole located closer than approximately 1,000 feet laterally from the well bore, the electric logging cable provides a higher speed sound transmission medium than the earth formation lying directly between the shot generating point and the geophone. As a result of this short-circuiting action of the suspension cable, it has been found necessary to employ a relatively long offset in a lateral direction between the well bore and the shot hole. In some instances, the longer offsets are not disadvantageous. However, frequently due to either rapidly changing contours in the weathered zone or the surface geology, it is either impractical or impossible to use these longer offsets. Additionally, offsets longer than about 1,000 feet may increase the computational errors due to the assumption that seismic waves travel along a straight line connecting the shot point and the geophone.

It is therefore an object of the present invention to provide seismic wave apparatus for obtaining velocity data with relatively short offsets between the shot point and the seismic wave-responsive apparatus.

It is a further object of the invention to provide seismic wave apparatus for obtaining velocity data at relatively shallow depths which is free of errors due to cable-borne impulses.

Another object is to provide a housing for the geophone or seismic transducer which translated mechanical vibrations into electrical signals, that will protect the transducer from detritus such as cuttings, cavings and the like in the well fluid.

It is a further object of the invention to provide apparatus for obtaining velocity data on seismic waves in earth formations at relatively shallow depths with greater reliability and accuracy than by previously known apparatus.

In general, the present invention relates to apparatus for suspending a seismic wave-responsive device in a bore hole comprising means yieldably supported by cable means and having a mass substantially greater than the mass of the seismic wave-responsive device, said housing providing support for said wave-responsive device whereby said responsive device may be supported in the well bore substantially isolated from vibrations transmitted through said cable means.

Further objects and advantages of the present invention will become apparent from the following specification taken in conjunction with the accompanying drawing which forms an integral part thereof.

Figure 1:
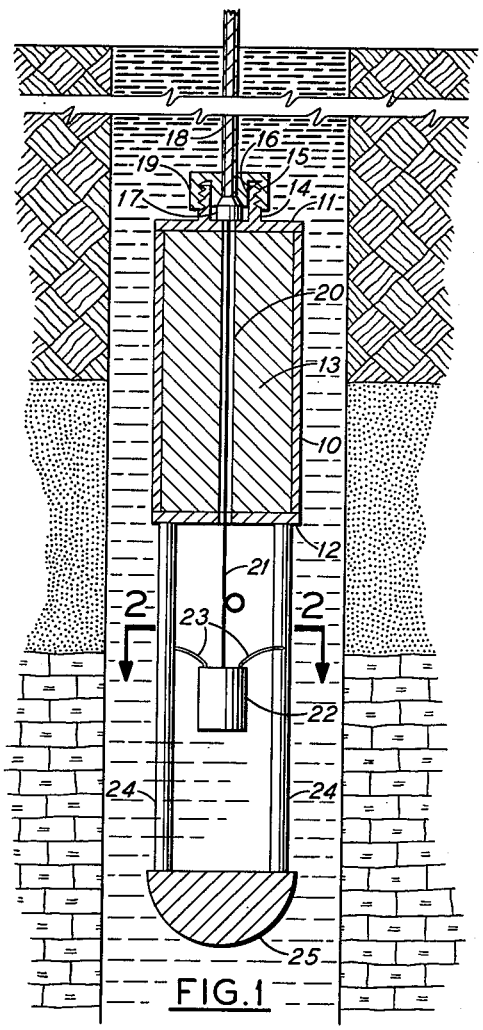
Fig. 1 is a schematic representation partially in cross-section of one form of apparatus utilized in the prior art for determining the velocity of seismic waves.
Figure 2:
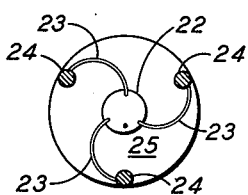
Fig. 2 is a cross-sectional view in the direction of arrows 2—2 in Fig. 1.

Referring now to the drawing, and in particular to Fig. 1, there is shown one form of apparatus which has been employed in the obtaining of velocity data for seismic wave investigations. As there shown, a housing designated generally as 10 which may be of cylindrical form is provided with upper and lower end plates 11 and 12, respectively, defining a chamber 13 which may be filled with a weighting material such as lead. Upper end plate 11 may be provided with a flange 14 having an externally threaded portion 15 and a center chamber or bore 16 into which the expanded end 17 of electric logging cable 18 is adapted to fit. A cap 19 is adapted to be secured over flange 14 so that housing 10 may be directly supported by cable 18. For the purpose of providing a passageway through chamber 13, an unobstructed bore 20 is provided which passes through end plates 11 and 12, as well as chamber 13. In this way, cable leads 21 are directly connected to the seismic wave device, for example, geophone 22. As best seen in Fig. 2, geophone 22 is mechanically supported by three leaf or wire springs 23 which in turn are supported by three vertical rods 24 extending downwardly from the lower end plate 12 and are held in a relatively fixed position with respect to each other by hemispherical weight 25.

In the operation of the apparatus shown in Figs. 1 and 2, the logging instrument is lowered into a well bore, which is normally filled with liquid, by means of cable 18 and is successively positioned at desired elevations. At the time that the instrument is at rest at each of these elevations a charge of dynamite is exploded in an adjacent hole (not shown) of relatively shallow depth, and the time interval is measured between the detonation of the shot and the first wave to arrive at the geophone 22. However, with this form of apparatus, when a relatively short lateral offset is used between the shot hole and the bore hole in which geophone 22 is located, the seismic waves may find their shortest path through cable 18, housing 10, rods 24 and springs 23 to geophone 22. Even if the first wave arriving at geophone 22 does not come directly through the supporting rods 24 and springs 23, the supporting housing 10 is sufficiently close to geophone 22 so that cable 18 may readily act as a transmission line to affect the fluid directly in contact with geophone 22.

In any event, it is well known that with the arrangement shown, the time interval between the detonation of the shot and the first arrival at the geophone is considerably shorter than would be possible by the transmission of elastic energy through the geological formations directly therebetween.

As stated hereinabove, where it is possible to use sufficiently large offsets or distances between the shot hole and the bore hole in which the geophone is located, such prior art apparatus as that illustrated in Figs. 1 and 2 has proved successful. However, where the topography of the earth's surface will not permit such a long offset, for example, where lakes or swampy terrain exist, the inherent limitations of long offsets have seriously limited the availability and dependability of velocity data obtained in this manner. Additionally, where there are abrupt changes in the nature of the weathered, or low-speed surface layer, long offsets, even where possible, may lead to serious errors in the computation of velocity data obtained by previously known equipment such as that herein described.

Figure 3:
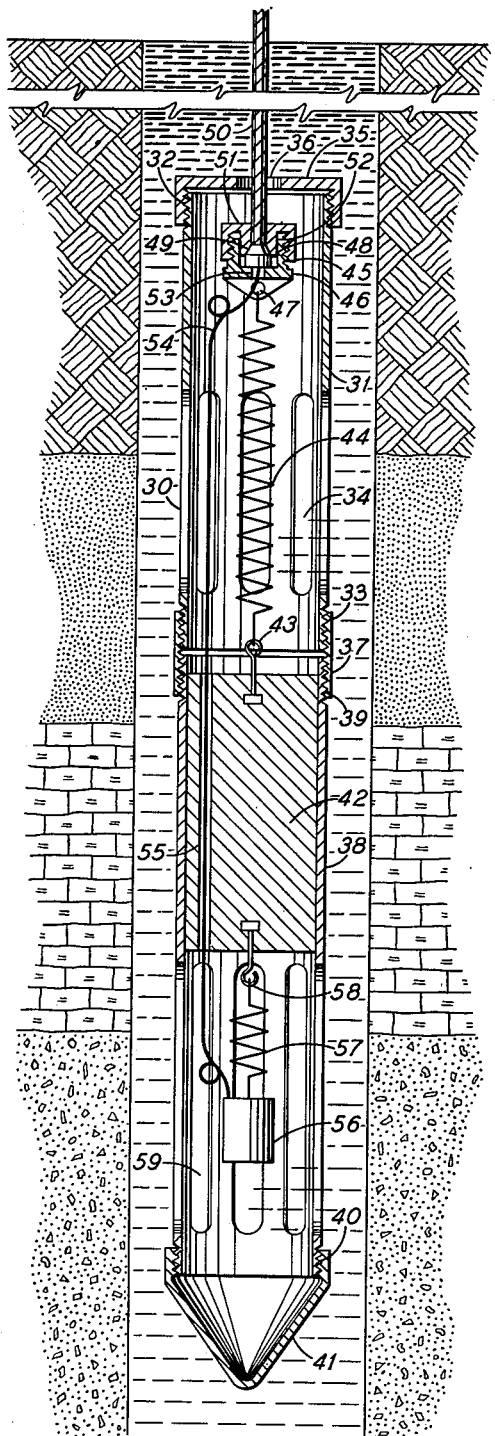
Fig. 3 is a schematic representation partially in cross-section of apparatus constructed in accordance with the present invention useful in obtaining velocity data for the interpretation of seismic wave records.

Referring now to Fig. 3, there is shown a preferred embodiment of an improved logging apparatus for obtaining velocity data for seismic wave energy in accordance with the present invention. As therein illustrated, the well logging apparatus, designated generally as 30, is of generally cylindrical configuration as shown. An upper housing 31 is preferably provided with threaded sections 32 and 33 adjacent its upper and lower ends for connecting the upper housing to the remainder of the logging apparatus. Upper threads 32 are adapted to engage a similar threaded element on a cap member 35 which preferably has a bore 36 in the center, through which the supporting cable may pass without physical contact. For a purpose to be explained hereinafter, a plurality of elongated slots 34 are preferably provided in the side walls of housing 31 to permit well fluid to enter the housing.

For ease in assembling the well tool, a coupling 37 having internal threads is adapted to engage the lower threads 33 on upper cylinder 31 and a similar set of upper threads 39 on lower housing cylinder 38. Lower cylinder 38 may be of generally the same configuration as upper cylinder 31, and is preferably provided with lower threads 40 which are adapted to engage a generally conical guide member 41. The upper portion of lower housing cylinder 38 is provided with a mass or weight member 42, such as a lead plug poured into the upper portion of cylinder 38. Weight member 42 preferably provides a supporting means for the logging tool through an upper hook member 43 embedded in the lead weight element as shown. Hook 43 serves as a connecting member for a yieldable support means such as spring 44 between the cable 50 and the logging tool. As shown, spring 44 is adapted to serve as a supporting means for the tool by connecting the hook 43 of the weight member 42 to an eye 47 in the tool support member, designated generally as 45. Tool support member 45 in general comprises a lower cup member 46 having a bore 48 adapted to receive the enlarged end 49 of cable 50 and a cap member 51 which is provided with threads 52 arranged to engage a similar set of threads on cup 46. A center bore 53 is preferably provided in cup 46 to permit insulated electrical leads 54 to pass from cable 50 downwardly through the chamber defined by cylinder 31, through a bore 55 in weight member 42 and thus to the seismic wave-responsive device, geophone 56. Geophone 56 is yieldably supported within the lower part of housing 38 by spring means 57 which engages a lower hook 58 secured to weight member 42.

As in the case of upper cylinder 31, lower cylinder 38 is preferably provided with a plurality of elongated ports or slots 59 which permit well fluid to enter the interior of the housing chamber defined by cylinder 38.

In operation, the logging device 30 is adapted to be positioned in the well bore so that geophone 56 is substantially isolated from vibrations transmitted through cable 50 by means of the yieldable support provided by spring 57 and spring 44 with weight member 42 acting as an inertia mass between the cable and the geophone. Preferably both springs 44 and 57 are relatively soft, so that the mass supported by each of these springs produces a natural frequency of from about .5 to 4 cycles per second for said springs. As shown, supporting member 45 is so proportioned that when instrument 30 is freely suspended in the well bore, the upper surface of cap 51 will not contact end plate 35. Bore 36 is so proportioned with respect to support member 45 that the member is substantially larger in diameter than bore 36, but, likewise, cable 50 is free to pass through bore 36 without interference. In this way, when it is desired to move well tool 30 from one position to another in the well bore, and especially when the apparatus is being raised, the upper surface of cap 51 may contact end plate 35 and thereby provide a positive connection between tool support 45, cable 50 and rigid end plate 35. In this way, spring 44 provides a normally yielding support means for the instrument, but additional tension may be applied directly to cable 50 to move the tool.

It will be apparent that in the taking of velocity data by conventional methods of seismic wave generation, cable-borne seismic impulses arriving at the device through cable 50 are not transmitted to mass 42 by yieldable support means 44. In this way geophone 56 is substantially isolated from such energy. However, seismic waves arriving through the earth's formations may be readily transmitted to geophone 56 through the surrounding well fluid and through slots 59 to the interior of the chamber defined by cylinder 38.

Figure 4:
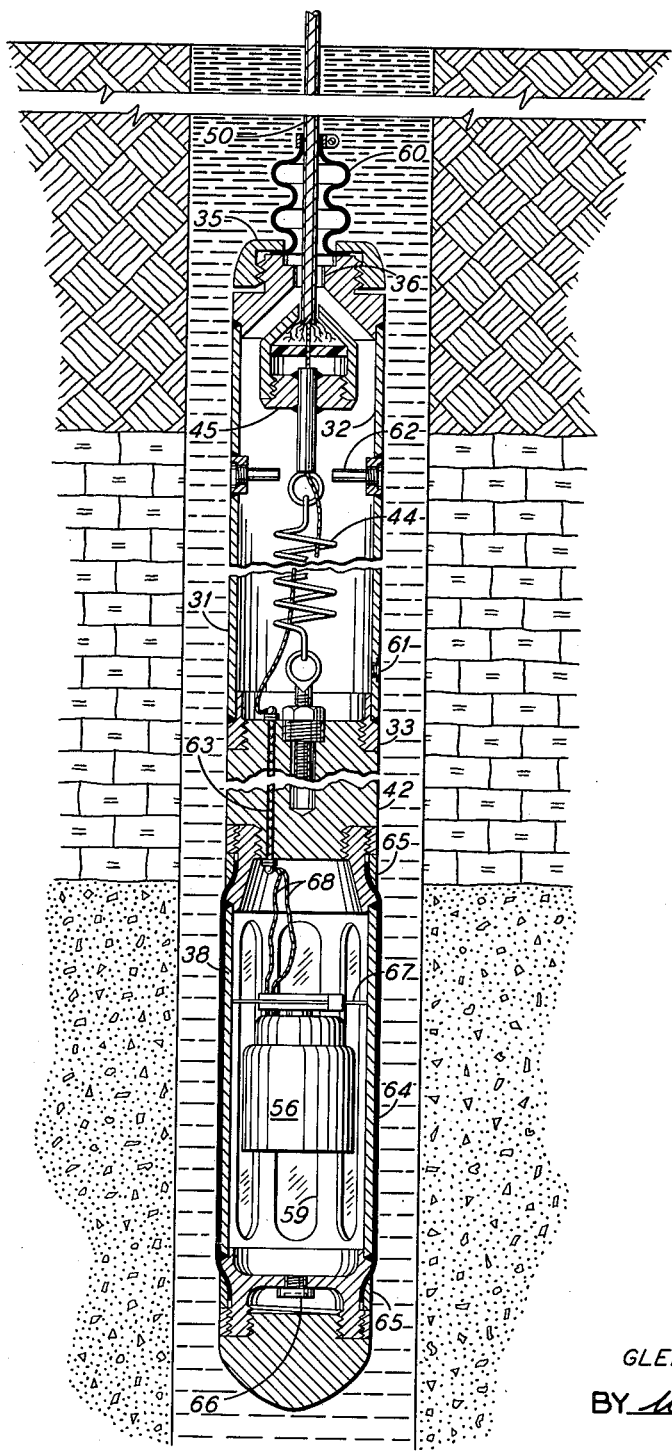
Fig. 4 is a schematic longitudinal sectional view of an alternative form of apparatus particularly designed to protect the seismic transducer from well fluids and detritus therein.

The alternative form of apparatus shown in Fig. 4 is particularly useful where the well bore passes through caving formations or where the fluid therein is contaminated with heavy mud, drill cuttings and the like which would enter the housing 38 through slots 59 and form a mechanical coupling between the geophone or transducer 56 and the body of the housing. Additionally, alternative forms of connections and sealing means between the cable 50 and the housing are shown in that figure.

Referring to Fig. 4, the upper housing 31 is provided with an upper threaded section 32 closed by a cap member 35 having a bore 36 in the center through which cable 50 may pass without physical contact. The space between bore 36 and cable 50, in this embodiment, is desirably sealed by means of a flexible or resilient, elongated bellows 60 secured at one end to the cap and at the other end to the cable so that the latter is free to move longitudinally with respect to upper housing 31. In this arrangement, upper housing 31 is made fluid-tight instead of being slotted, and a removable filling plug 61 is provided so that the space within that housing may be filled with a suitable liquid, such as oil, to balance the hydrostatic pressure of the well fluid. To facilitate prestressing or adjustment of spring 44 in housing 31, a plurality of inwardly-directed studs 62 are provided to engage the tool-support member 45. A sealed upper housing prevents detritus from filling the space surrounding spring 44 or bridging adjacent turns, which would tend to transmit mechanical vibrations from cable 50 to housing 31.

The lower threaded end 33 of upper housing 31 is connected to a solid weight member 42 which is traversed by a plurality of sealed and insulated electrical conductor elements 63 for carrying the electrical circuits from cable 50 to the transducer 56 in lower housing 38. The combined weights of the housing and weight member 42 should desirably be from about 5 to 10 times that of transducer 56, to act as the inertia mass previously mentioned.

Lower cylindrical housing 38, in this example, is made with a plurality of elongated ports or slots 59 in its wall, and these slots are covered or enclosed by a thin elastic sleeve 64 of synthetic rubber or the like, secured at its upper and lower ends to housing 38 by threaded retainers 65. A removable plug 66 is provided in the closure member 41 at the lower end of housing 38. The space inside of the housing and enclosing the geophone or seismic transducer 56 is desirably filled with liquid, such as oil, to balance the hydrostatic pressure of the well bore fluid and to provide adequate seismic coupling through the thin sleeve 64 to the well fluid surrounding the housing. The arrangement just described serves primarily to prevent sand or cuttings from entering the lower housing and making an undesired mechanical coupling directly between the transducer 56 and that housing. The resilient support means 57 for transducer 56 may either be the elongated spring shown in Fig. 3 or may be a plurality of tangentially-directed spring wires 67, as shown in Fig. 4. The insulated electrical connectors 68 leading from conductor elements 63 to geophone 56 should be extremely flexible to prevent mechanical coupling or vibration transmission between the geophone and the weight member 42.

While numerous modifications and changes in the apparatus described hereinbefore will occur to those skilled in the art, all such modifications and changes as fall within the scope of the appended claims are hereby intended to be included.

I claim:

1. Apparatus for determining the velocity of seismic waves through earth strata comprising a housing adapted to be lowered by logging cable means into a well bore, an inertia mass secured to said housing, yieldable support means for connecting said housing and said mass to said cable means and spring means for suspending a seismic wave responsive device from said mass.

2. Velocity logging apparatus for measuring seismic wave velocities comprising cable means, spring means for supporting an inertia mass from the end of said cable means and a seismic wave responsive device suspended from said mass by further spring means whereby said device may be isolated from cable-borne impulses which arrive prior to impulses transmitted through the earth strata under investigation when said impulses are generated by a common source.

3. A vibration isolating carrier for a bore hole geophone comprising a housing adapted to be lowered into a well bore, said housing having a weight substantially greater than that of said geophone, resilient means for connecting said housing to a supporting cable, port means in said housing and resilient means connecting said geophone to said housing.

4. In combination, cylinder means adapted to be lowered into a bore hole, weighting means rigidly secured within said cylinder means, spring means for supporting the upper end of said cylinder means from a cable, a ported chamber in the lower end of said casing below said rigidly secured weighting means and spring support means for a geophone affixed to said weighting means.

5. A carrier for a seismic transducer adapted to be lowered by a cable into a liquid-filled well bore for detecting vibrations propagated through the formations surrounding said bore, said carrier comprising a cylindrically-walled housing having a substantially greater mass than said transducer, a first liquid-filled chamber in said housing, a cable entrance for said chamber, resilient extensible means surrounding said entrance for sealing said cable therein, resilient means in said chamber for connecting said cable and said housing, a second liquid-filled chamber in said housing, means in said second chamber for resiliently supporting a seismic transducer therein, a plurality of apertures in said second housing, and a thin resilient member surrounding said apertures to prevent passage of liquid therethrough and to transmit seismic vibrations from the liquid-filled well bore to the liquid in said second chamber to actuate said seismic transducer.

6. A carrier for a seismic transducer adapted to be lowered by a cable into a liquid-filled well bore for detecting vibrations propagated through the formations surrounding said bore, said carrier comprising a cylindrically-walled housing having a substantially greater mass than said transducer, a resilient connector for said cable and said housing, a liquid-filled chamber in said housing, means in said chamber for resiliently supporting a seismic transducer therein, a plurality of apertures in said housing and resilient sealing means for said apertures to transmit seismic vibrations from the liquid in said well bore to the liquid in said chamber to actuate said transducer.

7. A vibration isolating carrier for a bore hole geophone, comprising a rigid weighted housing adapted to be lowered into a well bore, resilient means for connecting said housing to a supporting cable, a ported, liquid-filled chamber in said housing, resilient port-sealing means for said chamber, and a resilient geophone support affixed to said housing.

References Cited in the file of this patent

UNITED STATES PATENTS

| Number | Name | Date |
|---|---|---|
| 793,896 | Mundy | July 4, 1905 |
| 2,064,489 | Neuman | Dec. 14, 1936 |
| 2,241,428 | Silverman | May 13, 1941 |
| 2,361,458 | Converse | Oct. 31, 1944 |
| 2,449,085 | Peterson | Sept. 14, 1948 |
| 2,570,707 | Parr | Oct. 9, 1951 |